US007021576B2

(12) United States Patent
Poeltinger

(10) Patent No.: US 7,021,576 B2
(45) Date of Patent: Apr. 4, 2006

(54) BLADE MILL FOR GRINDING PLASTIC MATERIAL

(75) Inventor: Bruno Poeltinger, Balgach (CH)

(73) Assignee: Nuga AG Kunststoffschneidemühlen, Balgach (CH)

( * ) Notice: Subject to any disclaimer, the term of this patent is extended or adjusted under 35 U.S.C. 154(b) by 153 days.

(21) Appl. No.: 10/465,513

(22) Filed: Jun. 19, 2003

(65) Prior Publication Data

US 2004/0256507 A1 Dec. 23, 2004

(51) Int. Cl.
*B02C 18/16* (2006.01)

(52) U.S. Cl. ........................ 241/73; 241/224; 241/242; 241/285.3

(58) Field of Classification Search .................. 241/73, 241/74, 242, 243, 285.3, 224, 225
See application file for complete search history.

(56) References Cited

U.S. PATENT DOCUMENTS

| | | | | |
|---|---|---|---|---|
| 1,721,183 | A * | 7/1929 | McKain | 241/73 |
| 4,151,960 | A | 5/1979 | Peterson, Jr. | 241/73 |
| 4,351,488 | A | 9/1982 | Hess | 241/224 |
| 4,883,418 | A | 11/1989 | Hehl | 425/217 |
| 5,197,683 | A * | 3/1993 | Cravero et al. | 241/189.1 |
| 6,290,154 | B1 * | 9/2001 | Yoshida et al. | 241/65 |

FOREIGN PATENT DOCUMENTS

| | | |
|---|---|---|
| EP | 0 266 584 | 11/1989 |
| GB | 2 124 512 | 2/1984 |
| WO | WO 88/08751 | 11/1988 |

* cited by examiner

*Primary Examiner*—Mark Rosenbaum
(74) *Attorney, Agent, or Firm*—Baker & Daniels

(57) ABSTRACT

The invention describes a blade mill for grinding plastic material with a rotor which is driven in rotation inside a grinding chamber and has a plurality of radially outwards-pointing cutter blades distributed around its circumference and a plurality of stationary, radially inwards-pointing stator blades projecting into the grinding chamber and forming a blade gap with the cutter blades, wherein cutting spaces widening radially outwards in a crescent shape and located radially outside the turning circle of the rotating cutter blades are located ahead of the stator blades in the direction of rotation of the rotor. To prevent the plastic material which is to be ground from backing up in the cutting spaces and from being crushed against the wall of the screen baskets, the invention provides that the motion path of the rotor blades extend eccentrically with respect to the axis defined by the screen baskets. Relaxation spaces in which the plastic material is accommodated and which extend over a large rotational angle of the rotor blades are thereby formed in the gap between the wall of the screen baskets and the orbital path of the rotor blades. This allows the driving power of the drive motor to be significantly reduced for a given cutting performance.

17 Claims, 7 Drawing Sheets

BLADE MILL FOR GRINDING PLASTIC MATERIAL

The invention relates to a blade mill for grinding plastic material, as disclosed by EP 0946304 B1 originating from the same inventor. The disclosure of that publication is intended to be included in its entirety in the disclosure of the present invention. All features described therein are also part of the present invention.

For the grinding of plastic material, especially thermoplastic material, the invention described in EP 0946304 B1 has yielded great benefits. It has already described a system whereby the plastic material to be ground by blades is fed through a feed opening to a screw conveyor which introduces this material centrally and in the axial direction into a grinding or cutting chamber (which will later also be called the filling chamber). The advantage of this feed system is that the material to be chopped and ground up is introduced into the processing chamber centrally and then conveyed radially outwards into the gap between the rotating rotor blades and the stationary stator blades.

EP 0946304 B1 showed radially outwards-widening crescent-shaped cutting chambers in which the plastic material to be ground was conveyed parallel with the screen wall of the screen baskets by the rotor blades. This is a disadvantage because the material was carried along parallel with the wall of the screen baskets over a large angular sector of e.g. 90°.

In that publication the motion path of the rotor blades was aligned centrally with respect to the wall of the screen baskets.

A drawback therefore existed in that the material being screened was pressed, at the front of each rotor blade, on to the screen basket wall running parallel therewith, with braking effect due to its thermoplastic properties. Owing to the resultant friction it became strongly heated and exerted a powerful braking action on the rotor.

The drawback therefore existed that the rotor needed relatively high driving power to deliver a given cutting performance.

It was only shortly before the point at which the fixed stator blade and the corresponding rotor blade came in register that the screen chamber widened outwards to form a holding space for the material about to be chopped. This holding space was provided not with a view to reducing the driving power of the rotor, but simply so that the material could back up in front of the stator blade before it passed into the gap between the rotor and the stator blade and was cut.

A further drawback of the known blade mill was that thermoplastically fluid plastic materials tended to smear in the region of the screen openings of the screen baskets. The friction, described above, between the plastic material conveyed by the rotor blades and the screen wall occurred over an undesirably large angular zone. In principle, the material being ground was crushed into this parallel space between the path of the rotor blades and the wall of the screen, where it became fluid and stuck to the screen openings in an undesired manner, with the possibility of clogging.

Owing to the high friction of the material in the parallel space between the path of the rotor blades and the corresponding wall of the screen baskets, a kneading of the plastic material also occurred. The conveyed plastic material coalesced into large beads. These beads were then no longer cuttable, and grew with increasing temperature and volume into ever-larger formations which eventually brought the rotor to a standstill.

With the known blade mill, the drawback therefore existed that certain flowable plastic materials e.g. ABS plastics were difficult or impossible to grind. The reason for this drawback was that, as explained above, the path of the rotor blades was coaxial with the screen wall of the screen baskets, so creating an undesired parallel space.

Thus the grinding-chamber axis defined by the screen basket was coaxial with the motion path of the rotor blades.

The problem which lies at the basis of the invention, therefore, is to develop a blade mill of the kind stated at the outset so that considerably more reliable grinding of plastic materials, including thermoplastically fluid materials, is assured, with a drive motor of substantially lower driving power, and with no loss of cutting performance.

For the solution to the problem, the invention proposes that the motion path of the rotor blades extend eccentrically with respect to the axis defined by the screen baskets.

This eccentric offset of the screen basket wall with respect to the motion path of the rotor blades yields the advantage that a steadily widening relaxation space is formed between the path of the rotor blades and the wall of the screen baskets. The material dwells in this relaxation space over a large rotational angle of the rotor blades of preferably 90° without being crushed in a friction-boosting manner between the rotating rotor blades and the opposing stationary screen chamber wall. The parallel space with the drawbacks described above is therefore avoided.

The material being ground is distributed by the rotating rotor blades into the relaxation spaces which are large in area and volume, so preventing crushing of the material.

One preferred embodiment of the invention relates to the provision of two screen baskets arranged so as to be pivotable towards each other, the axis of symmetry of each screen basket having an eccentric offset with respect to the rotational axis of the rotor blades. Two opposing relaxation spaces for the ground material, widening in an approximately crescent shape, are defined.

But the invention is not limited to this arrangement. In the simplest embodiment, the invention claims a single, rotationally symmetrical, drum-shaped (cylindrical) screen plate, defining a single grinding-chamber axis which—in keeping with the point of the invention—is arranged eccentrically with respect to the orbital path of the rotor blades.

However, for the sake of simplicity, the following description will be based on two opposed screen baskets. In this embodiment, the axis defined by one screen basket must have an upward eccentric offset from the rotational axis of the rotor blades, while the axis defined by the other screen basket has a downward eccentric offset. Thus the axes of the two screen baskets are offset in opposite directions.

If three screen baskets are provided, each screen basket must, in keeping with the present invention, be offset with respect to the rotating axis of the rotor blades, which remains unchanged.

Hence the invention is not restricted to one arrangement in which there are two opposed screen baskets. Any desired number of screen baskets—one or more—may be used to realize the inventive idea.

Each relaxation space is formed on the radially outward side by the eccentrically and arcuately outwards-receding wall of the screen basket concerned. On its radially inner surface each relaxation space is formed by the back of the rotor blade(s), which is moreover configured in a special way to enhance the relaxation effect on the material in the relaxation space.

For this purpose the invention provides that the back of the rotor blade be angled obliquely into the grinding chamber, forming not a straight line but a stepped angle piece which consists (in cross-section) of a series of straight lines joined to each other at an angle.

A curved radius may also be used for the back of the rotor blade, instead of individual straight portions set at different angles.

The advantage of shaping the back of the rotor blade in this way is that the material on the surface of the back of the rotor blade is shed, and—because its surface slopes down into the filling chamber—the material is not pressed against the wall of the screen basket, but drops into the filling chamber.

Another feature of the invention is that each relaxation space is bounded, in the circumferential direction of the filling chamber, by a stationary stator blade. The material hits the front of this stator blade and—as it is lying on the back of the rotor blade—drops back into the filling chamber.

An important feature here is that starting from the front of the stator blade there is another, smaller relaxation space which extends as far as the next, staggered, stator blade on the circumference.

A distinctive feature of the blade mill is that stator blades are arranged on the circumference in twos, one behind the other in the direction of rotation with an angular stagger of approximately 15°, with, between them, a radially outwards-extending relaxation space widening in an approximately crescent shape. In all, two pairs of stator blades are preferably provided. One pair is located at the top, and the other pair at the bottom.

The purpose of these shorter (in terms of rotational angle) relaxation spaces formed between the pairs of stator blades is to enable the material to relax in this zone between the stator blades, so that increased friction is avoided here also.

The relaxation space between stator blades is also needed to provide a filling space for the material. The idea is to bring a defined volume of material into the region forward of the stationary stator blade where it can be cut by the rotating rotor blades.

The rotor consists of a total of three rotor blades uniformly distributed around the circumference, which are opposed by a total of four stator blades arranged in pairs around the circumference. Each pair of stator blades has an angular spacing of approximately 15°.

A description has already been given of how crushing of the heat-sensitive plastic material is prevented by the large-area relaxation spaces widening in a crescent shape in the region of the screen chamber walls; and therefore of how the phenomenon of kneading of the plastic material into large beads, eventually immobilizing the rotor, is also prevented.

A special conformation of the screen openings in the screens utilized also serves to solve the same problem i.e. that of reducing friction.

The important feature here is that the screen openings are not formed with a cylindrical profile as in the state of the art, but have a conformation deviating from the cylindrical.

Proceeding from the filling chamber (i.e. radially outwards), the screen opening initially forms a first radiused section defined by radii; this part narrows at first but then merges tangentially into a conical section that widens outwards.

This yields the advantage that the cut material passes initially into the short radiused section defined by radii, where it is sized over a short radial distance, until it reaches the adjoining longer conical section, where it is no longer subject to friction; and is sucked outwards.

A particularly easy, low-friction passage of the cut material through the screens which form part of the screen baskets is thus assured.

The conveying systems for conveying the material into the filling chamber which will now be described also serve to solve this problem of assuring an improved cutting action even with heat-sensitive material.

In a first embodiment, a screw conveyor, known in itself, driven in rotation, and arranged horizontally in a casing, is provided. The casing forms a vertically upwards-directed feed hopper. An important feature of this known conveying system is that at least the turns of the screw which extend axially into the filling chamber describe an envelope curve that is cylindrical. At the axial end of the screw conveyor which is located inside the filling chamber, the screw shaft is flared, or widens radially outwards in a conical shape. This flared section extends radially outwards until it almost reaches the volute of the screw, which has a uniformly cylindrical configuration over its entire axial length.

The material is received at the axially orientated intake to the filling chamber, and conveyed through the filling chamber in the longitudinal direction, by the cylindrical turns of the screw. At the end of this axial transfer, the material moves radially outwards into the zone of the flared screw shaft, and is conducted radially outwards into the vicinity of the rotating rotor blades.

Another system of conveying (gravity conveying) is also claimed as essential to the invention. This gravity conveying is claimed as essential to the invention if it stands alone. However, it is also claimed as essential to the invention if used in combination with the remaining features described above.

The object of this gravity conveying is that a feed hopper through which the material to be processed is fed into the filling chamber from above is arranged coaxially with the rotor which has been described.

An essential feature is that an axially shiftable displacement-body, preferably with a conical tip, is arranged at the bottom end of the filling chamber. The displacement-body can be shifted within the filling chamber in a controlled manner and extends with variable volume into the filling chamber.

If it is withdrawn from the filling chamber, more material can be fed into the chamber. If, however, it is pushed axially into the filling chamber, there is a reduction in the volume of material that can be fed into the chamber from outside.

The shifting of the displacement-body in the filling chamber is regulated to suit the driving power of the drive motor. To allow the drive motor to deliver approximately constant power, the displacement-body is pushed to a greater or lesser extent into the filling chamber for a specific, defined driving power.

Say the filling chamber is filled with material requiring high cutting power. The displacement-body will then be inserted further into the filling chamber to reduce the available volume for material to be processed and to run the drive motor at constant power.

Contrariwise, the displacement-body is largely withdrawn from the filling chamber when a plastic material is to be ground which requires only low driving power of the drive motor.

The subject-matter of the present invention follows not only from the subject-matter of the individual claims considered separately, but also from the individual claims taken in combination with each other.

All details and features disclosed in the documents, including the abstract, and in particular the configurative form shown in the drawings, are claimed as essential to the invention insofar as, taken separately or in combination, they are novel in relation to the state of the art.

The invention will now be described in detail with reference to drawings illustrating several ways of carrying out the invention. Further essential features and advantages of the invention will become apparent from the drawings and their description.

Figure 1:
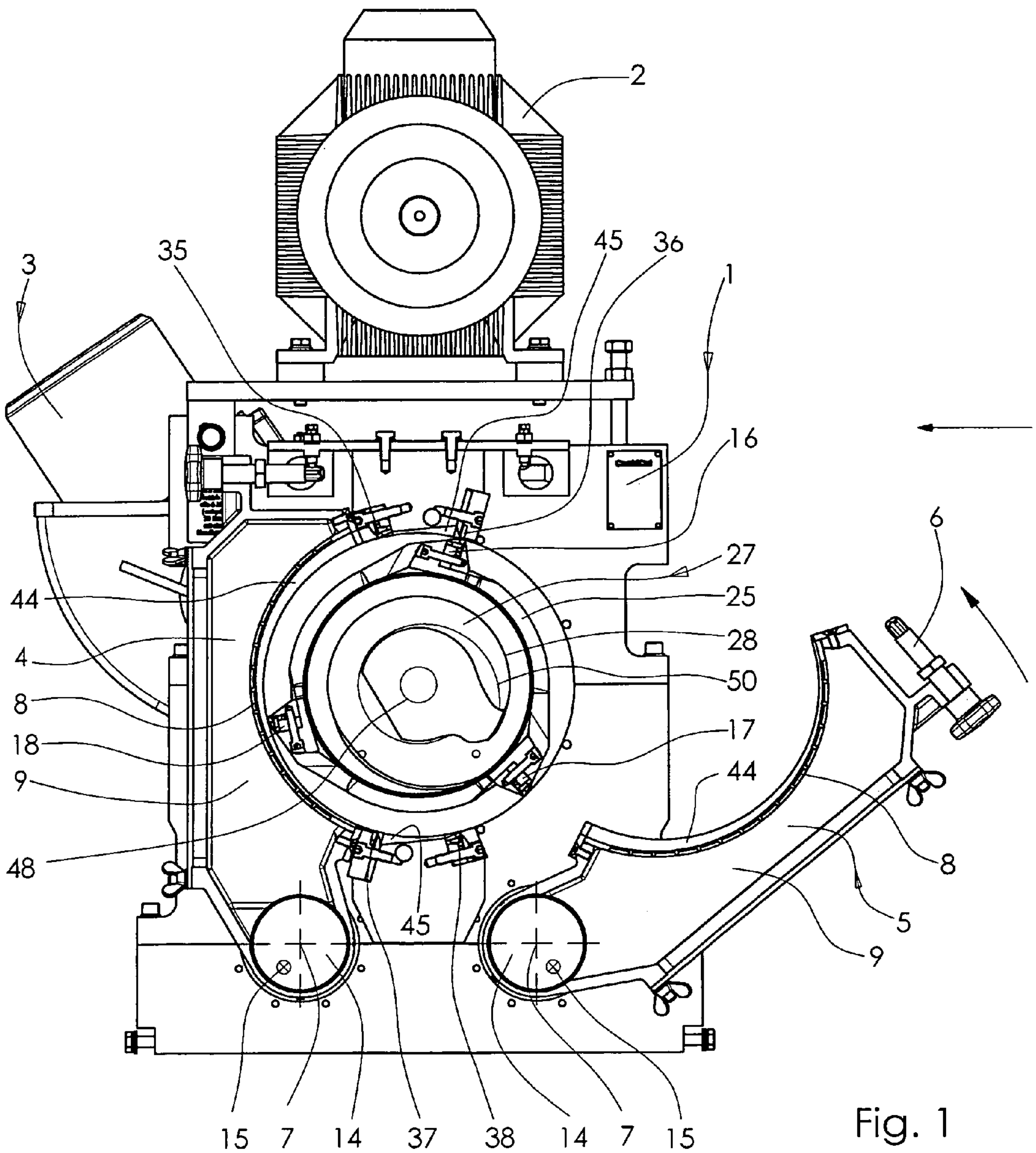
FIG. 1 is an end view of a first embodiment of a blade mill with one screen basket swung clear.
Figure 5:
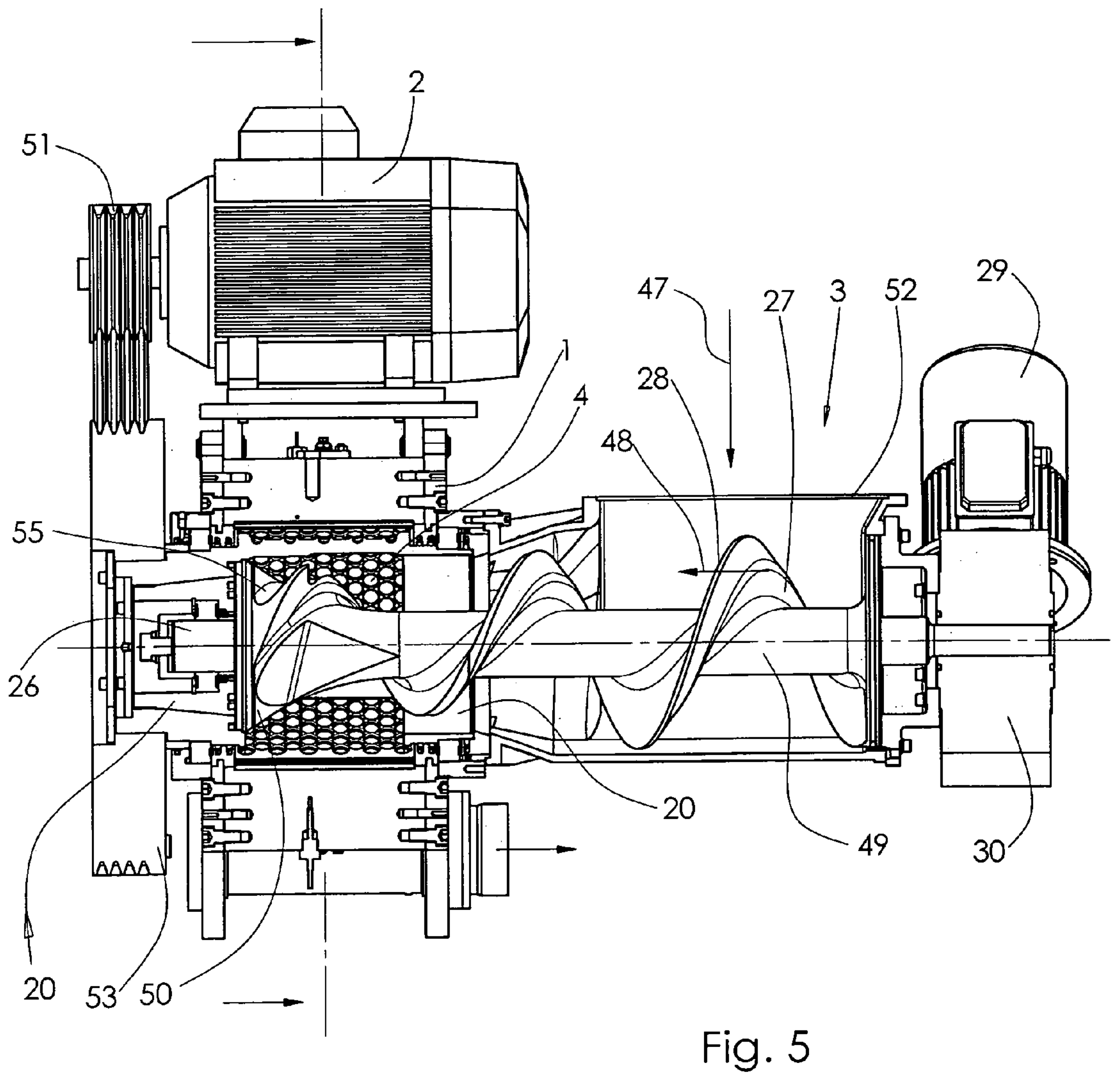
FIG. 5 shows schematically a section through the blade mill according to FIG. 1, with screw conveyor revealed.
Figure 6:
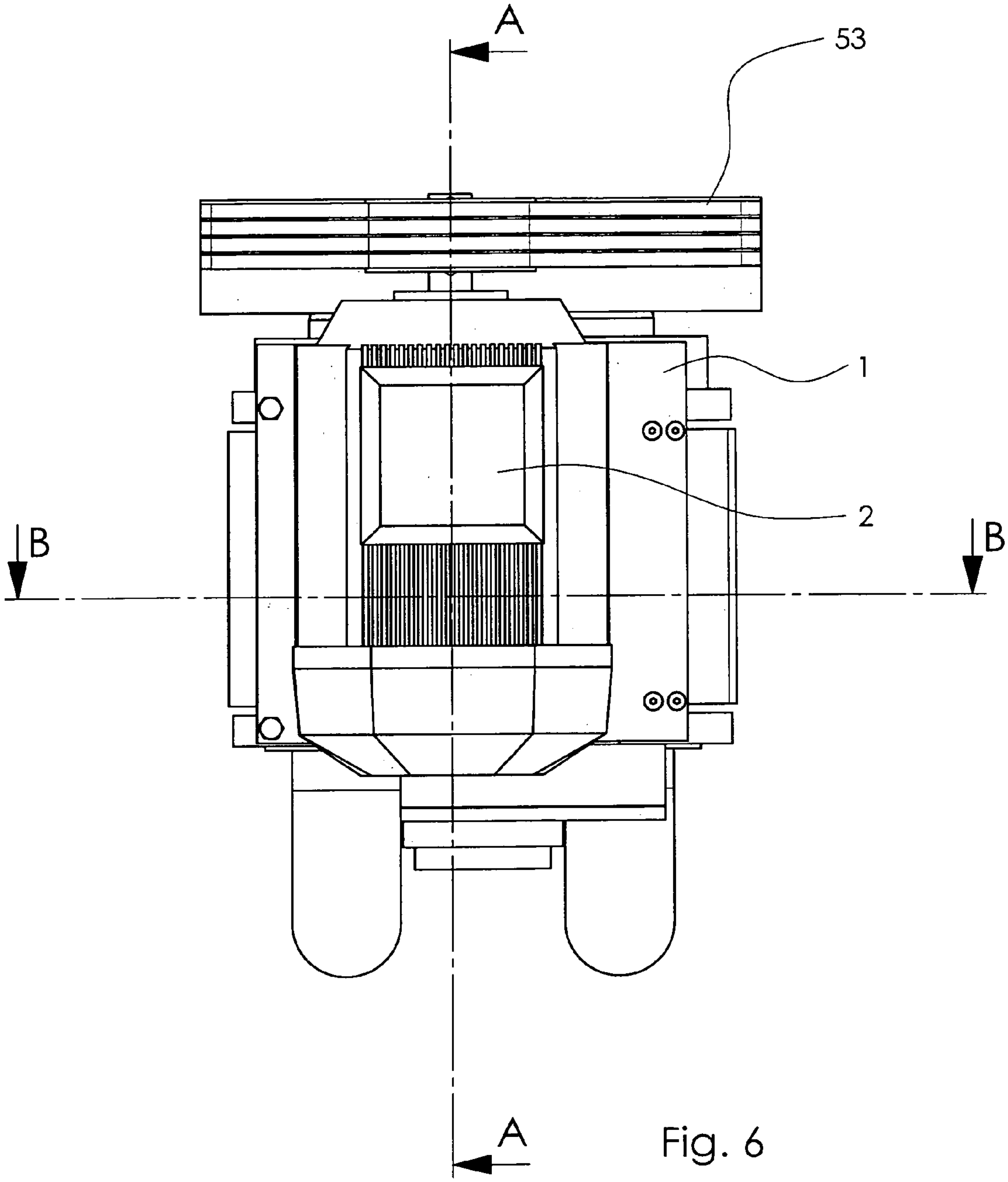
FIG. 6 is a top view of a blade mill in a second configuration with a gravity conveyor.
Figure 7:
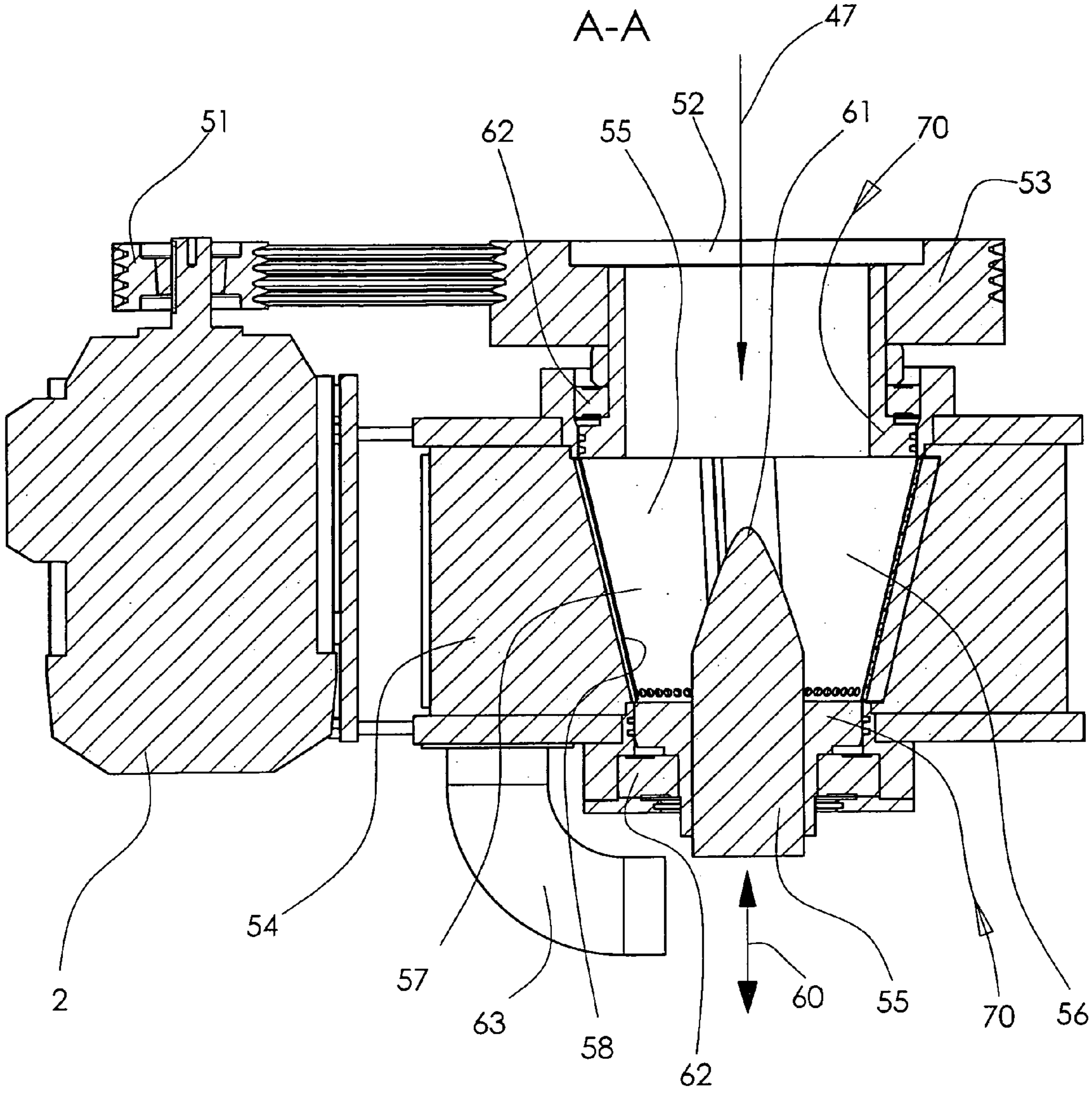
FIG. 7 is a section on the line A—A in FIG. 6.

In FIG. 1 a drive motor 2 is flange-mounted on a casing 1; as shown in FIG. 5, this motor drives, through a drive pulley 51 and a belt drive, a flywheel 53 which is connected fixedly in rotation to a rotor 20.

A screw conveyor 3 which will be described later with the help of FIG. 5 is connected on one side of the casing 1.

The rotor consists of a rotor disc 25 (see FIG. 2) which is driven in rotation inside the filling chamber 55. A total of three blade carriers 21, 22, 23 distributed around the circumference are attached fixedly in rotation to the rotor disc. Each blade carrier 21–23 has a blade holder 19 which carries a rotor blade 16, 17, 18.

The front of the rotor blade 16–18 is shielded by a tapered shield strip 24 extending into the filling chamber 55.

The rotor 20 is driven in rotation inside the filling chamber 55 in the direction of the arrow 13, and the radially outwards-pointing tip of each rotor blade 16–18 describes a centric orbit 31.

An important feature of the embodiment shown in the drawing is that two screen baskets 4, 5 facing opposite ways are provided. The two screen baskets 4, 5 are of similar construction. They can be fastened together in their upper region by a fastener 6; to improve the clarity of the drawing, FIG. 1 shows one screen basket 5 opened and swung clear.

However, in the working position both screen baskets 4, 5 are closed, and the fastener 6 connects the upper ends of the two screen baskets 4, 5.

Each screen basket 4, 5 is pivotably mounted in the region of a lower pivot bearing 7, and this pivot bearing is surrounded by an air duct 14 through which the processed material is extracted from the filling chamber 55 in the direction of the arrow 15.

Figure 2:
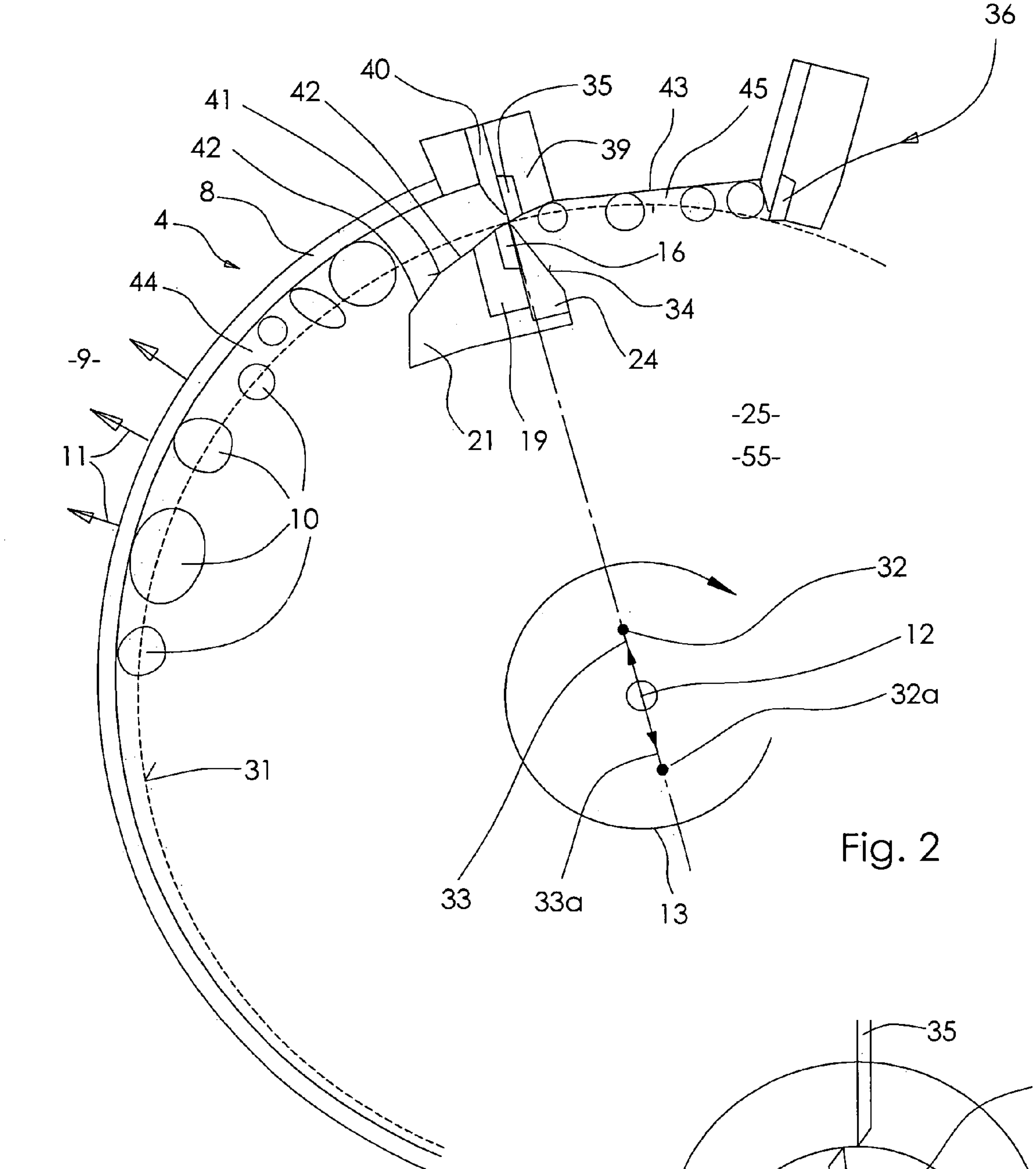
FIG. 2 shows schematically a section through the upper part of a filling chamber of the blade mill according to FIG. 1.
Figure 4:
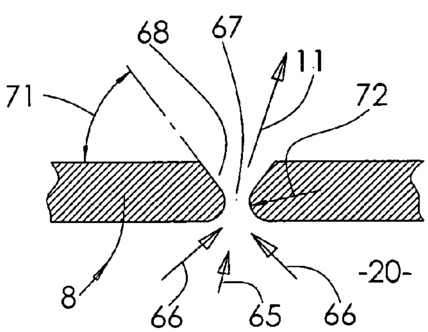
FIG. 4 shows an enlarged section through a screen opening in a screen.

As FIG. 2 shows, each screen basket 4, 5 forms a screen 8 with screen openings 65. A typical screen opening 65 is shown in FIG. 4.

The end of the screw conveyor 3 extends into the filling chamber 55. At shown in FIG. 5, the screw conveyor 3 comprises a shaft 49 driven in rotation on the outer circumference of which the conveyor screw 27 is arranged. Outside the filling chamber 55 the turns 28 of the screw have a converging taper, whereas the envelope curve of the screw turns 28 in the region of the filling chamber 55 has a cylindrical form.

The shaft 49 of the screw conveyor 3 is driven in rotation by a drive motor 29 through a gear 30.

The end of the shaft 49 projecting beyond the filling chamber is carried in a screw bearing 26 arranged in the rotor 20.

The material to be ground is fed into the feed hopper 52 of the screw conveyor 3 in the direction of the arrow 47 and passes into one axial end of the filling chamber 55 of the blade mill in the direction of the arrow 48. The material is then conducted along the flared shaft 49 (conical widening 50) in the radially outwards direction towards the screen 8 of the screen baskets 4, 5.

It is chopped up in accordance with the principle to be explained with the aid of FIG. 2 and then passes into the cavities 9 formed in the screen basket 4, 5, where it accumulates, and is extracted via the air duct 14 in the direction of the arrow 15.

As shown in FIGS. 1 and 2, two fixed stator blades 35, 36 are arranged in the upper region of the casing 1 with an angular separation of approximately 15°. Stator blades 37, 38 likewise separated by an angle of 15° are located opposite, in the lower part.

In the schematic drawing of FIG. 2 only the upper stator blades 35, 36 are shown, but the description also applies to the lower stator blades 37, 38.

An important aspect is that the envelope of the rotating rotor blades 16–18 describes a circular path, namely a centric orbit 38 whose centre lies in the rotational axis 12.

Another important aspect is that the left screen basket 4 forms a cylindrical wall with the screen 8, which wall is eccentric (offset) with respect to the grinding chamber axis 32.

This forms for the left screen basket 4 a relaxation space 44 widening in a crescent shape over a large rotational angle of the rotor blades and extending—in the direction of rotation—from the lower stator blade 38 to the upper stator blade 35.

Material settling on the back 41 of the rotor blade 16 is carried in the direction of the arrow 13 from the lower part of the relaxation space 44 into the area of the relaxation space 44 which widens out in a crescent shape, so that friction of the material 10 against the wall of the screen 8 is prevented.

On the contrary: the material 10 is able to expand and increase in size in the relaxation space 44 widening in a crescent shape, without being crushed against the wall of the screen 8.

Hence, low driving power is required for the rotor 20 and the rotor blades 16–18 connected fixedly in rotation thereto.

An important feature is that the back 41 of the rotor blades is defined by angle pieces 42 tapering at an oblique angle into the filling chamber 55 so that material 10 deposited on the back 41 of the rotor blade drops into the filling chamber. Hence it does not impinge on the front of the blade shield 40 of the stationary stator blade 35.

The stator blade 35 comprises the abovementioned blade shield 40 and the blade holder 39.

Since the blade shield 40 is tapered and points inwards into the filling chamber 55, the material 10 is not jammed against it but drops inwards on to the tapered downwards-sloping back 41 of the rotor blade and into the filling chamber.

Meanwhile, the material in front of the rotor blade 16–18 is guided by the tapering forwards-facing front face 34 towards the stator blade 35 where it is reliably ground.

The ground residues are conveyed into a further relaxation space 45 which is formed between the first stator blade 35 and the second stator blade 36 located at a short angular interval of approximately 15° behind it in the circumferential direction. The material backs up in this second relaxation space 45 in front of the second stator blade 36, and is then moved towards the follow-up rotor blade 16, to be ground for a second time.

An important point here is that the lower screen basket 5 (not shown in FIG. 2) with its screen 8 is likewise offset with respect to the rotational axis 12, this time by a downward offset 33*a* (i.e. opposite to the offset 33 mentioned above)—establishing a further grinding chamber axis 32*a* for the centric wall of the screen 8 of the screen basket 5.

Thus the cylindrical wall of the screen 8 (screen basket 4) is offset upwards from the rotational axis 12 of the rotor 20 by the offset 33, while the screen 8 of the screen basket 5 is offset downwards by the offset 33*a*.

Figure 3:
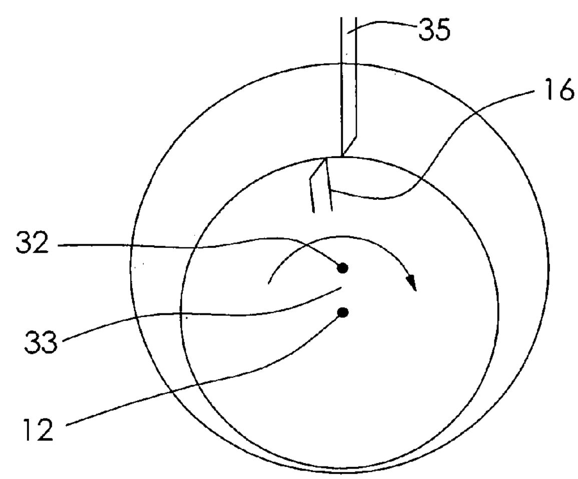
FIG. 3 shows schematically a further embodiment of a blade mill with a single drum-shaped screen.

However, if a single screen basket is used, as shown in FIG. 3, it is sufficient to offset this screen basket with respect to the grinding chamber axis 12 by an offset 33. It then also suffices to oppose a single fixed stator blade 35 to one rotating rotor blade 16.

FIG. 2 shows how processed material is conveyed through the screen openings in the screens in the direction of the arrows 11. To boost the driving power, it is therefore important that the material should be conveyed through the screen openings 65 of the screen 8 with the least possible amount of friction.

For this purpose, the invention provides two screen openings ranged one behind the other in the radial direction, as shown in FIG. 4. The processed material is conveyed in the direction of the arrow 66 towards a first screen opening formed by a radiused section 67. This radiused section 67 is defined by the radius 72. The radiused section 67 has a short radial length which serves as a sizing aperture for the material 10 passing through it. This radiused section 67 is followed by a conical section 68 of greater radial length which is defined by the cone lines enclosing an angle 71.

This yields the advantage that the processed material is led out through the large conical section 68 with little or no friction.

FIG. 5 shows further details of the blade mill of FIG. 1. Again, to improve the clarity of the drawing, the lower screen basket 5 is shown opened, while the upper screen basket 4 is shown in its working, closed position.

FIGS. 6 to 10 show another embodiment of a blade mill, with a gravity conveyor. Here the drive motor 2 drives a drive pulley 51 which is connected by a belt drive to the flywheel 53, which, in turn, is connected fixedly in rotation to a rotor 70.

Figure 10:
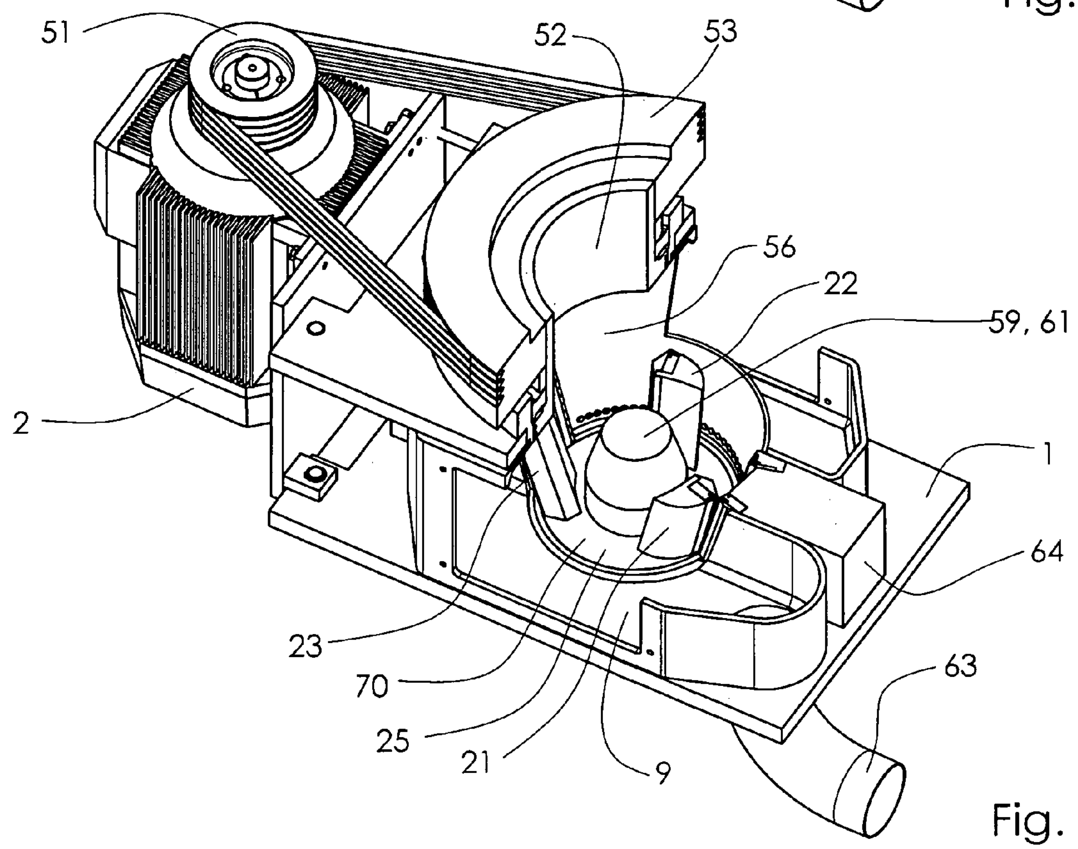
FIG. 10 is a partly broken-open view of the blade mill according to FIG. 9.

The rotor consists, as shown in FIG. 10, of a lower rotor disc 25 to which the blade carriers 21–23, uniformly distributed around the circumference, are attached fixedly in rotation. A rotor blade 16–18 is arranged at each blade carrier 21–23 in the manner which has been described.

Figure 8:
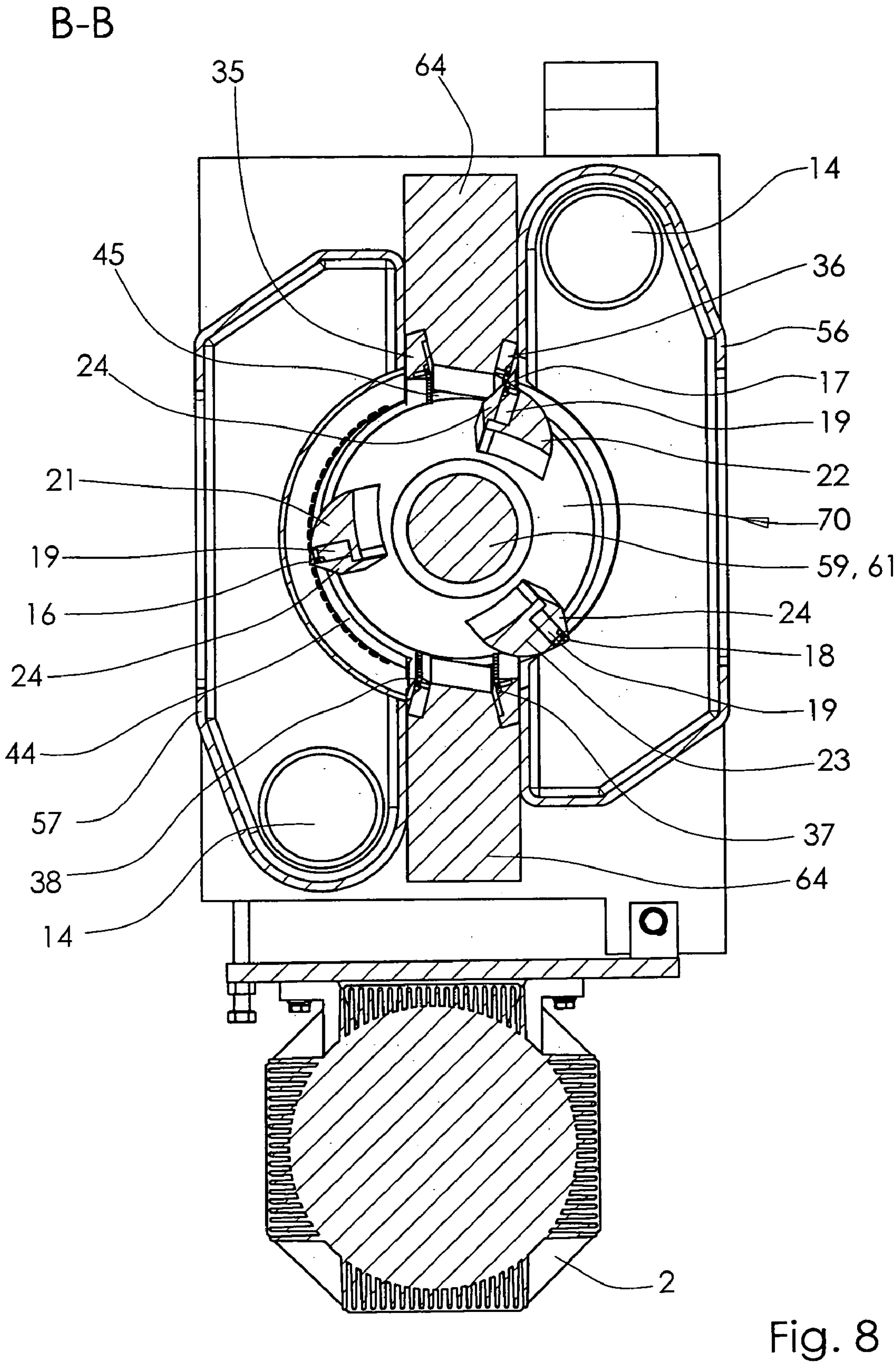
FIG. 8 is a section on the line B—B in FIG. 6.
Figure 9:
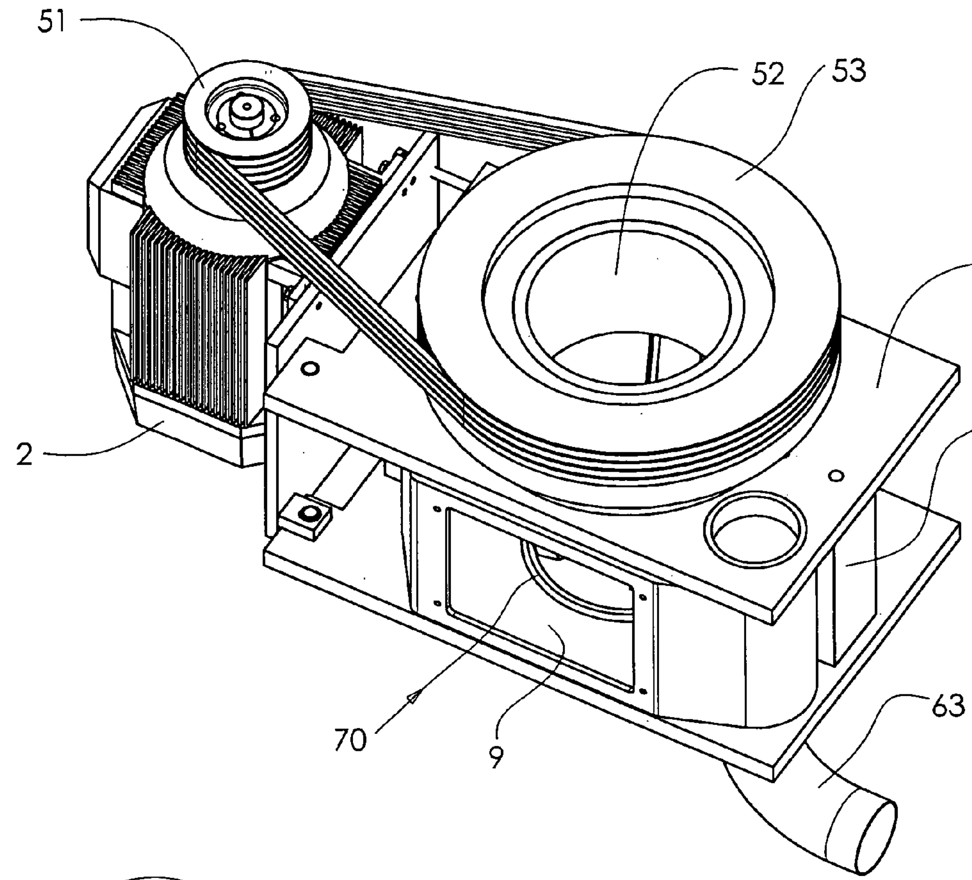
FIG. 9 is a perspective view of the blade mill according to FIGS. 7 and 8.

An important feature is that a displacement-body 59 with a conical upper tip 61 projects into the filling chamber 55 and is mounted displaceably in the direction of the arrows 60. It can therefore be pushed into the filling chamber 55 to a greater or lesser extent. The two screen baskets 4, 5 described above are pivotably mounted in the same way, as shown in FIG. 8. These screen baskets 56, 57, however, are cone-shaped, as shown schematically by the conical surface 58 in FIG. 7.

The two screen baskets 56, 57 form a filling chamber 55 which is wider than the feed hopper and into which the material for processing can be introduced in the direction of the arrow 47.

The rotor 70 is mounted in the casing 54 at two opposite points, each rotor bearing being designated 62.

An extraction tube 63 is also shown. This takes ground material from each cavity 9 of the two screen baskets 56, 57 and leads it away.

Just as was shown schematically in FIG. 2, two diametrically opposed crescent-shaped relaxation spaces 44 are again provided in this embodiment, and extend over a rotational angle of approximately 120°.

In the same way as was previously described, these relaxation spaces are succeeded by the previously mentioned smaller relaxation spaces 45 between the fixed stator blades 35, 36. The smaller relaxation space is, incidentally, bounded radially outwards by an impervious grinding chamber wall 43.

The adoption of gravity conveying in a blade mill according to the invention likewise has the aim of solving the problem of making the drive as frictionless as possible. This is ensured by the arrangement of the abovementioned relaxation spaces 44, and by the displacement-body 59 which projects displaceably into the filling chamber 55 and whose position is regulated as a function of the driving power of the drive motor 2.

Gravity conveying has the advantage that the drive motor needed for a screw conveyor can be dispensed with altogether, so that a much smaller casing is needed for the blade mill. The blade mill can be constructed at lower cost, and needs only low driving power as only a single drive motor 2 is required since the drive motor for the conveyor is eliminated.

Even large pieces of plastic material can be fed through the feed hopper 52 arranged vertically above the filling chamber 55. A screw conveyor limits the size of the pieces of plastic material that can be inserted, as the screw blades are only able to shift relatively small pieces. This limitation disappears with the gravity conveyor described above.

DRAWING LEGEND

1 casing
2 drive motor
3 screw conveyor
4 screen basket
5 screen basket
6 fastener
7 pivot bearing
8 screen
9 cavity
10 cutting material
11 direction arrow(s)
12 rotational axis
13 direction arrow
14 air duct
15 direction arrow
16 rotor blade
17 rotor blade
18 rotor blade
19 blade holder
20 rotor
21 blade carrier

22 blade carrier
23 blade carrier
24 shield strip
25 rotor disc
26 screw bearing
27 conveyor screw
28 turn (or blade) of screw
29 drive motor
30 gear
31 orbital path (rotor blades 16–18)
32 grinding chamber axis
32*a* grinding chamber axis
33 offset
33*a* offset
34 front face
35 stator blade
36 stator blade
37 stator blade
38 stator blade
39 blade holder
40 blade shield
41 back of rotor blade
42 angle piece
43 grinding chamber wall
44 relaxation space (large)
45 relaxation space (small)
46
47 direction arrow
48 direction arrow
49 shaft
50 conical widening or flare
51 drive pulley
52 feed hopper
53 flywheel
54 casing
55 filling chamber
56 screen basket
57 screen basket
58 conical surface
59 displacement-body
60 direction arrow
61 conical tip
62 rotor bearing
63 extraction tube
64 stator blade holder
65 screen opening
66 direction arrow
67 radiused section
68 conical section
69
70 rotor
71 angle
72 radius

What is claimed is:

1. Blade mill for grinding plastic material with a rotor roller which is driven in rotation inside a grinding chamber and has a plurality of radially outwards-pointing cutter blades distributed around its circumference and a plurality of stationary, radially inwards-pointing stator blades projecting into the grinding chamber and forming a blade gap with the cutter blades, wherein cutting spaces widening radially outwards in a crescent shape and located radially outside the turning circle of the rotating cutter blades are formed ahead of the stator blades in the direction of rotation of the rotor, characterized in that the motion path of the rotor blades is eccentric with respect to the axis defined by the screen baskets and in that the crescent-shaped cutting spaces are configured as relaxation spaces for the plastic material to be ground.

2. Blade mill according to claim 1, characterized in that a steadily widening relaxation space is formed between the motion path of the rotor blades and the wall of the screen baskets by the eccentric offset of the screen basket wall with respect to the motion path of the rotor blades.

3. Blade mill according to claim 2, characterized in that two screen baskets pivotable at one end are provided, and in that each screen basket with its rotational axis has an eccentric offset with respect to the rotational axis of the rotor blades.

4. Blade mill according to claim 2, characterized in that a single rotationally symmetrical, cylindrical screen plate is provided which defines a single grinding chamber axis arranged eccentrically with respect to the rotating motion path of the rotor blades.

5. Blade mill according to claim 2, characterized in that each relaxation space is formed on the radially outward side by the eccentrically and arcuately outwards-receding wall of the screen basket concerned, and in that each relaxation space is formed at its radially inner surface by the back of the rotor blade.

6. Blade mill according to claim 2, characterized in that the back of the rotor blade is directed obliquely or arcuately into the grinding chamber.

7. Blade mill according to claim 1, characterized in that two screen baskets pivotable at one end are provided, and in that each screen basket with its rotational axis has an eccentric offset with respect to the rotational axis of the rotor blades.

8. Blade mill according to claim 7, characterized in that each relaxation space is formed on the radially outward side by the eccentrically and arcuately outwards-receding wall of the screen basket concerned, and in that each relaxation space is formed at its radially inner surface by the back of the rotor blade.

9. Blade mill according to claim 1, characterized in that a single rotationally symmetrical, cylindrical screen plate is provided which defines a single grinding chamber axis arranged eccentrically with respect to the rotating motion path of the rotor blades.

10. Blade mill according to claim 9, characterized in that each relaxation space is formed on the radially outward side by the eccentrically and arcuately outwards-receding wall of the screen basket concerned, and in that each relaxation space is formed at its radially inner surface by the back of the rotor blade.

11. Blade mill according to claim 1, characterized in that each relaxation space is formed on the radially outward side by the eccentrically and arcuately outwards-receding wall of the screen basket concerned, and in that each relaxation space is formed at its radially inner surface by the back of the rotor blade.

12. Blade mill according to claim 1, characterized in that the back of the rotor blade is directed obliquely or arcuately into the grinding chamber.

13. Blade mill according to claim 1, characterized in that stator blades are arranged around the circumference in twos, one behind the other in the direction of rotation and separated by an angular interval of approximately 15°, with, between them, a radially outwards-extending relaxation space widening in an approximately crescent shape.

14. Blade mill according to claim 1, characterized in that the rotor consists of three rotor blades uniformly distributed around the circumference that are opposed by a total of four stator blades arranged around the circumference in pairs.

15. Blade mill according to claim 1, characterized in that each screen opening of the screen—proceeding radially outwards from the filling chamber—forms a first radiused section defined by radii, narrowing initially but then merging tangentially into a conical section that widens outwards.

16. Blade mill according to claim 1, characterized in that a horizontal conveyor screw, driven in rotation, has screw blades with a cylindrical envelope curve in the part extending into a filling chamber and in that the screw shaft is flared, or widens radially outwards in a cone shape, at the axial end of the conveyor screw arranged in the filling chamber.

17. Blade mill according to claim 1, characterized in that a feed hopper through which the material for cutting is fed into the filling chamber from above is arranged coaxially with the rotor and in that an axially shiftable displacement-body which reaches with variable volume into the filling chamber is arranged at the bottom end of the filling chamber.

* * * * *